United States Patent

[11] 3,621,274

| [72] | Inventor | Gabriel Plond |
| | | Paris, France |
| [21] | Appl. No. | 70,793 |
| [22] | Filed | Sept. 9, 1970 |
| [45] | Patented | Nov. 16, 1971 |
| [73] | Assignee | Thomson-CSF |
| [32] | Priority | Sept. 9, 1969 |
| [33] | | France |
| [31] | | 6930547 |

[54] TRIGGERED PULSE GENERATOR
7 Claims, 9 Drawing Figs.

[52] U.S. Cl. ..................................... 307/106,
328/63
[51] Int. Cl. ..................................... H03k 3/00
[50] Field of Search ........................... 328/63, 59;
307/261, 106, 107, 108; 333/20

[56] References Cited
UNITED STATES PATENTS
3,333,120  7/1967  Tomlin ..................... 307/106

*Primary Examiner*—Herman J. Hohauser
*Attorney*—Edwin E. Greigg

ABSTRACT: A triggered pulse generator comprising a load inductor, controlled discharging means and pulse shaping means; the load inductor builds up the secondary winding of a transformer whose primary winding is fed with a sawtooth voltage synchronized with the discharging means control.

The voltage of the triggered pulse may be controlled through controlling the duration of the teeth of the sawtooth voltage.

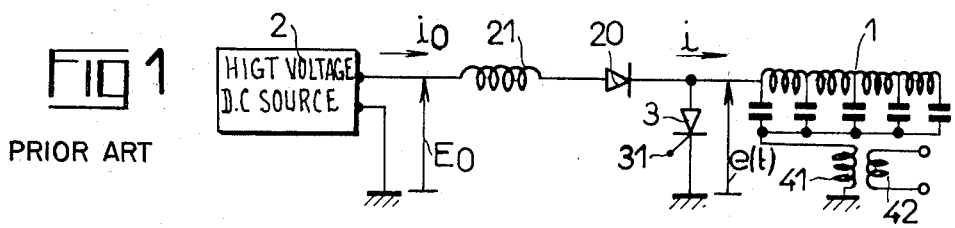

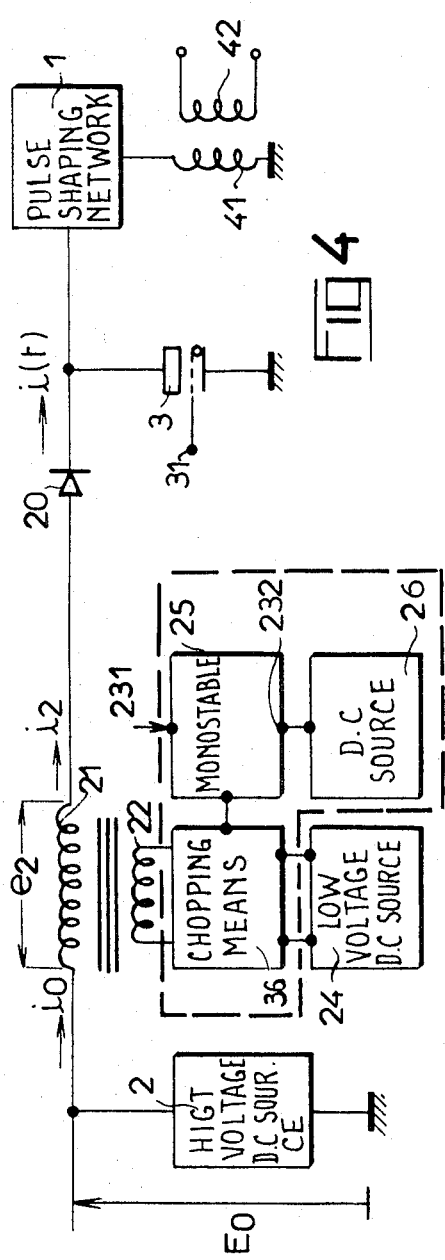
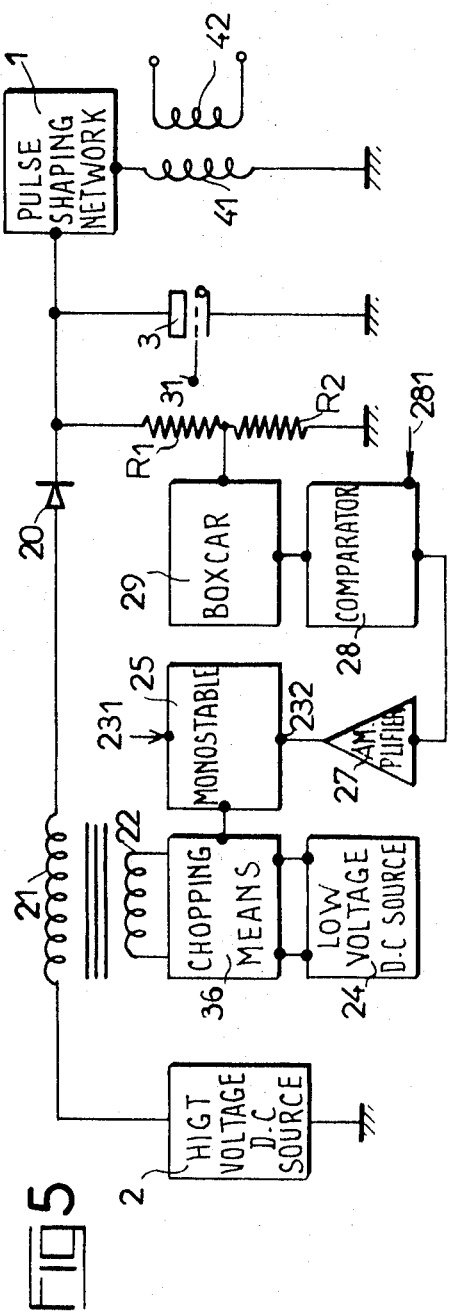

TRIGGERED PULSE GENERATOR

The present invention relates to generators producing triggered pulses.

Conventional triggered pulse generators comprise pulse-shaping means, charging means and discharge means controlled by synchronizing pulses. The pulse-shaping means are generally built up from an artificial delay line with inductor in series and capacitors in parallel; they are considered as being equivalent to an overall capacity C which is charged up and discharged at the recurrent rate determined by the synchronizing pulses. The charging means may comprise a charging circuit and a charging source. The charging circuit serves to transfer the charge from the source to the pulse-shaping means. In conventional devices, the charging circuit comprises the series arrangement of the charging inductor with an inductivity L, and a charging diode which isolates the pulse-shaping means after the charging process.

The charging source delivers a high DC voltage which is generally obtained from an AC network be rectification. If the available supply is a low DC voltage source, then a DC-AC-DC converter becomes essential in order to produce the charging voltage.

However, there are several problems to overcome. In other words, where the value of the e.h.t. is to be adjusted, this is usually done by employing tappings provided in the supply transformer, before rectification. The accuracy of this kind of adjustment is limited, the adjustment is not convenient and the resulting transformer is an expensive item.

On the other hand, when it is necessary to stabilize the e.h.t., the whole of the power supplied by the source has to be regulated by means of a ballast tube or by means of a converter with pulse-width modulation means. However, the known regulating systems exhibit drawbacks in terms of safety, weight and price.

Now, the conventional discharge means either employ thyristors when powers of less than 200 watts are required or alternatively thyratrons controlled by the synchronizing pulses, and discharging the pulse-shaping means across the primary of a pulse transformer whose secondary is connected to a load impedance, for example of a magnetron.

Precisely in this latter case, when frequency agility is required, i.e., when a slight modulation of the magnetron frequency is to be obtained by slight modulation of the supply voltage, conventional supplies are no more adequate.

The object of the present invention, accordingly, is a generator producing triggered pulses, which is free of the above-mentioned drawbacks.

According to the invention, there is provided a triggered pulse generator, for generating pulses triggered by synchronization signals, said generator comprising:
a pulse shaping network;
a first inductor having a first grounded terminal and a second terminal coupled to said pulse shaping means;
discharge means coupled to said second terminal, having a control input for receiving the synchronization signals;
a second inductor;
means for electromagnetically coupling said second inductor to said first inductor; and
sawtooth voltage generating means having a synchronization input for receiving the synchronization signals, and an output coupled to said second inductor.

For a better understanding of the invention and to show how the same may be carried into effect, reference will be made to the drawings accompanying the following description and in which:

FIG. 1 illustrates a basic diagram of a conventional pulse generator;

FIG. 2 illustrates the basic diagram of a device in accordance with the invention;

FIGS. 3a to 3e illustrate the voltages and currents plotted as a function of time, as they occur in operation of the device shown in FIG. 2.

FIG. 4 illustrates a block circuit diagram in which the device of FIG. 2 provides a variable additional voltage which is added to the charging voltage.

FIG. 5 illustrates a block circuit diagram in which the device of FIG. 2 is used to stabilize the charging voltage.

In these figures, like reference characters refer to like parts.

The device shown in FIG. 1 comprises a pulse-shaping network 1. Generally speaking, this network is an artificial delay line in the form of series-connected coils and parallel capacitors. In the following, it will be assumed that it is roughly equivalent, from the point of view of the charging process, to a capacitor of capacity C. This network is charged by means of a charging circuit comprising the series arrangement of a doubler charging coil 21, of inductivity L, and a charging diode 20, the charge being supplied from a DC high-voltage source 2 producing a voltage $E_0$. A device 3 for producing triggered discharges, as the case may be in the form of thyristors or thyratrons, with a terminal 31 to which the synchronizing pulses are applied, is connected in parallel with said network. The discharge time is much shorter than the charging time, the former being only 0.1 to 10$\mu$s for example for a charging time which may last for example for a fraction of a millisecond. This charging is effected across the primary winding 41 of a load transformer whose secondary winding 42 is connected to the load device (not shown), for example a magnetron transmitter.

With the synchronizing pulses being produced at the times $t_1$, $t_2$ etc., say every millisecond for example, we will now consider the time $t_1$ at which the pulse-shaping network has discharged.

The voltage $E_0$ is applied across the coil 21, of inductivity L, and the charging diode 20, to the capacitor of capacity C which is equivalent to the pulse-shaping network. The charging time $i(t)$ and the charging voltage $e(t)$ are defined as a function of time by:

$$i(t) = \frac{E_0}{\sqrt{\frac{L}{C}}} \sin \frac{t}{\sqrt{\frac{L}{C}}}$$

$$e(t) = E_0 \left(1 - \cos \frac{t}{\sqrt{LC}}\right)$$

Because of the presence of the charging diode, these relationships only apply between:
$$0 \leq t \leq \pi\sqrt{LC} \text{ where } \pi\sqrt{LC} < t_2 - t_1$$

At the end of the charging step, the pulse-shaping network is charged to the voltage 2 $E_0$ and is insulated by the charging diode until discharge is triggered by the synchronizing pulse $t_2$, and so on.

The pulse generator shown in FIG. 2 comprises elements of the device of FIG. 1 but, here, the charging circuit includes in series the secondary winding 21 of the transformer whose primary 22 is supplied with a sawtooth wave form current; to this end, a low DC voltage generator 24 supplies a chopping means 23 with voltage E; the chopping means 23, which is fed at 231 with the synchronizing pulses, is coupled to the primary winding 22.

At the instant $t_1$, the chopping means 23 connects the source 24 to the terminals of the primary 22, the inductivity of which is $L_1$, this for a cutoff time T which depends upon the design of the chopping means but is given roughly by:
$$T + (2\pi\sqrt{LC})/4 < t_2 - t_1$$

Accordingly, the voltage E will be applied across the terminals of the primary 22 for a time T, from which we obtain the value $e_1(t)$, FIG. 3a.

As a result there flows in said primary winding a current which rises linearly as a function of time $i_1(t)$ up to a maximum $i_1 m = ET/L_1$:

$$i_1(t) = \int_0^t \frac{e_1(t)}{L_1} dt$$

the sawtooth wave forms of the current $i_1$ having a period of T.

At the instant $t_{11}$ (likewise $t_{21}$ etc.), that is to say at the end of the time T, the chopping means cuts off the current $i_1$.

However, since electromagnetic energy has been stored in the transformer circuit, a voltage $e_2(t)$ and a current $i_2(t) = f(t)$ will be induced in the secondary 21. Calling $n$ the transformer ratio: $n = \sqrt{L/L_1}$, $L_1$ being the inductivity of the primary winding, this voltage $e_2(t)$ and current $i_2$ will have the form (taking $t_{11}$ as the time base origin):

$e_2(t) = (n ET)/L \sin t/\sqrt{LC}$ (FIG. 3c)
$i_2(t) = (i_{1m})/n \cos t/\sqrt{LC}$ (FIG. 3d)

with maxima at:
$e_{2m} = (i_{1m})/n\sqrt{L/C} = (n ET)/L$
$i_{2m} = (i_{1m})/n$ Of course, these time based functions are only valid for:
$0 \leq t/(\sqrt{LC}) \leq \pi/2$.

Because of the presence of the diode 20 and blocked discharge means 3 (thyristor in this case), the pulse-shaping means 1 will be charged by a voltage $2e_m$ until the next synchronizing pulse occurs, and so on. FIG. 3e plots the voltage $e(t)/2$ across the terminals of the pulse-shaping means, which latter will be charged by a voltage $2e_m$ from $t_{12}$ to $t_2$, $t_{22}$ to $t_3$ and so on.

So far, the device according to the invention has been described as being utilized as a charging circuit proper.

The device shown in FIG. 4 is in series with an e.h.t. source 2, whereby it operates as a charge boosting and regulating means.

In this figure, the source voltage has been called $E_o$ and $i_o$ is the charging current produced by said source.

We meet the elements 20, 21, 1, 3, 31, 41 and 42 for the second time here.

A monostable trigger 25 is connected to the chopping means proper 36 and controls the same.

This monostable trigger is itself triggered at 231 by the synchronizing pulses; its relaxation time T is controlled by the element 26, for example, a controlled amplitude DC current source. The element 26 thus produces modulation of the magnetron frequency, through the control of its supply voltage. Thus, a slight wobbulation of the frequency of the charging magnetron, from one pulse to the next, is achieved and this is referred to usually as "frequency agility."

There is no need to write the equations of the currents and voltages in this case, but it is of evidence that the voltage $E_o$ and $e_2$ will be additive over a charging period and the charging voltage will be higher than $2 E_o$, the latter being the value which would be obtained if the device in accordance with the invention were not provided. A boost of for example 20 percent power is thus obtainable.

An alternative embodiment is shown in FIG. 5, where the system according to the invention is employed for regulating the charging voltage.

In this figure, a fraction of the charging voltage is tapped off by the divider built up from the resistors $R_1$ and $R_2$, and applied to a storage-type sampler 29, for example a boxcar circuit of the kind described by Sarbacher in pages 189-190 of Encyclopaedic Dictionary Electronics and Nuclear Engineering, Pitner Edition 1959.

This sampler enables comparison between the reference voltage and the voltage, which is to be regulated, at instants $t_{12}$ to $t_2$, $t_{22}$ to $t_3$, FIG. 3, to be effected. The full diagram is within the scope of the person skilled in the art and has not been shown in detail here. The sampler 29 is connected to a comparator 28 which is supplied on the other hand with a reference voltage at 281.

The comparator is connected through the medium of an amplifier 27 to the monostable trigger circuit 25 at 232, where regulation is effected by control of T as in the case of FIG. 4.

Of course, the invention is not limited to the embodiments nor to the applications described and shown, which where given solely by way of examples.

What is claimed, is:

1. A triggered pulse generator, for generating pulses triggered by synchronization signals, said generator comprising:
   a pulse shaping network;
   a first inductor having a first grounded terminal and a second terminal coupled to said pulse shaping means;
   discharging means coupled to said second terminal, having a control input for receiving the synchronization signal;
   a second inductor;
   means for electromagnetically coupling said second inductor to said first inductor; and
   sawtooth voltage generating means having a synchronization input for receiving the synchronization signals, and an output coupled to said second inductor.

2. A pulse generator as claimed in claim 1, further comprising means for coupling a high voltage DC source in series between ground and said first terminal.

3. A pulse generator as claimed in claim 2, wherein said sawtooth voltage generating means comprise a first low voltage DC source having an output, and chopping means, inserted between said first low-voltage source output and said second inductor.

4. A pulse generator as claimed in claim 3, wherein said chopping means comprises a one-shot multivibrator having a duration control input, and an output, and a switch having a signal input coupled to said first low voltage source output, a signal output coupled to said second inductor, and a control input coupled to said multivibrator output.

5. A pulse generator as claimed in claim 4, wherein said multivibrator comprises a duration control input, and said pulse generator further comprises a controllable low voltage DC source coupled to said duration control input.

6. A pulse generator as claimed in claim 5, wherein said multivibrator comprises a duration control input coupled to said comparator output.

7. A pulse generator as claimed in claim 2, comprising further means for regulating the voltage at said second terminal of said first inductor, said further means comprising a control loop having a reference input, an input coupled to said second terminal and an output coupled to said sawtooth voltage generating means for controlling the duration of the teeth of said sawtooth voltage.

* * * * *

PO-1050
(5/69)

UNITED STATES PATENT OFFICE
CERTIFICATE OF CORRECTION

Patent No. 3,621,274          Dated November 16, 1971

Inventor(s) Gabriel Plond

It is certified that error appears in the above-identified patent and that said Letters Patent are hereby corrected as shown below:

On the cover sheet, "9 Drawing Figs." should be concelled and -- 5 Drawing Figs. -- should be inserted.

Signed and sealed this 23rd day of May 1972.

(SEAL)
Attest:

EDWARD M. FLETCHER, JR.　　　　　　ROBERT GOTTSCHALK
Attesting Officer　　　　　　　　　　Commissioner of Patents